(12) United States Patent
Smith et al.

(10) Patent No.: US 12,112,179 B1
(45) Date of Patent: Oct. 8, 2024

(54) APPARATUS AND METHOD FOR DYNAMIC RECONFIGURATION OF PROCESS PARAMETER

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/609,711

(22) Filed: Mar. 19, 2024

(51) Int. Cl.
   *G06F 9/44* (2018.01)
   *G06F 9/445* (2018.01)

(52) U.S. Cl.
   CPC .............. *G06F 9/44505* (2013.01)

(58) Field of Classification Search
   CPC .............. G06F 9/44; G06F 1/32; G06F 1/12
   See application file for complete search history.

(56) References Cited

U.S. PATENT DOCUMENTS

| 6,172,773 | B1  | 1/2001 | Ulichney |
| 7,971,150 | B2  | 6/2011 | Raskutti |
| 2008/0025378 | A1* | 1/2008 | Mahany ............. H04B 1/707 375/150 |
| 2018/0089154 | A1* | 3/2018 | Balasubramanian ......... G06F 11/3684 |
| 2021/0056462 | A1  | 2/2021 | Kotarinos |

\* cited by examiner

*Primary Examiner* — Keshab R Pandey
(74) *Attorney, Agent, or Firm* — Caldwell Intellectual Property Law

(57) ABSTRACT

The apparatus employs adaptive machine learning for dynamic reconfiguration of process parameter. It consists of a processor and memory. Initially, it detects a dependency factor as a function of a plurality of operational factors of a process. Then it determines a primary factor and at least a secondary factor as a function of the dependency factor. Using at least a processor, modify a processor, the primary factor as a function of a specified modification protocol. Further, it eliminates the at least a secondary factor. Last, using the at least a processor, it generates using the at least a processor, a modification set of the operational factors.

20 Claims, 6 Drawing Sheets

APPARATUS AND METHOD FOR DYNAMIC RECONFIGURATION OF PROCESS PARAMETER

FIELD OF THE INVENTION

The present invention generally relates to the field of simulation and modeling. In particular, the present invention is directed to an apparatus and method for dynamic reconfiguration of process parameter.

BACKGROUND

In modern computational systems, there exists a technical challenge in the dynamic optimization of operational processes due to the complex interplay of multiple factors that affect system performance. Specifically, the difficulty lies in effectively identifying and understanding the dependencies and impacts among a vast array of operational factors. These factors can be highly variable and interdependent, making it challenging to discern which elements are critical to the system's efficiency and outcomes. The intricate nature of these relationships often leads to inefficiencies, underperformance, and increased complexity within the system, impeding the ability to achieve optimal operational states. Traditional methods struggle to adapt to changing conditions and to accurately pinpoint which factors should be adjusted to improve performance, without introducing unnecessary complications or overlooking potential enhancements.

SUMMARY OF THE DISCLOSURE

In an aspect, an apparatus for dynamic reconfiguration of process parameter is described. The apparatus includes at least a processor and a memory communicatively connected to the at least a processor, wherein the memory containing instruction configuring the at least a processor to detect a dependency factor as a function of a plurality of operational factors, the computing device configured to determine a primary factor and at least a secondary factor as a function of the dependency factor, the computing device configured to modify the primary factor as a function of a specified modification protocol, the computing device configured to eliminate the at least a secondary factor, the computing device configured to generate a modification set of the operational factors.

In another aspect, a method for dynamic reconfiguration of process parameter is described. The method includes detecting, using at least a processor, a dependency factor as a function of a plurality of operational factors, detecting, using at least a processor, a dependency factor as a function of a plurality of operational factors, determining, using the at least a processor, a primary factor and at least a secondary factor as a function of the dependency factor, modifying, using the at least a processor, the primary factor as a function of a specified modification protocol, eliminating, using the at least a processor, the at least a secondary factor, and generating, using the at least a processor, a modification set of the operational factors.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dynamically optimizing a set of operational factors within a computing environment. In an embodiment, a processor-integrated apparatus employs advanced computational techniques to analyze and assess the interdependencies among these factors.

Aspects of the present disclosure allow for the real-time adjustment and streamlining of operational factors to enhance system performance and adaptability. Exemplary embodiments illustrating aspects of the present disclosure are described below in the context of several specific examples.

Figure 1:
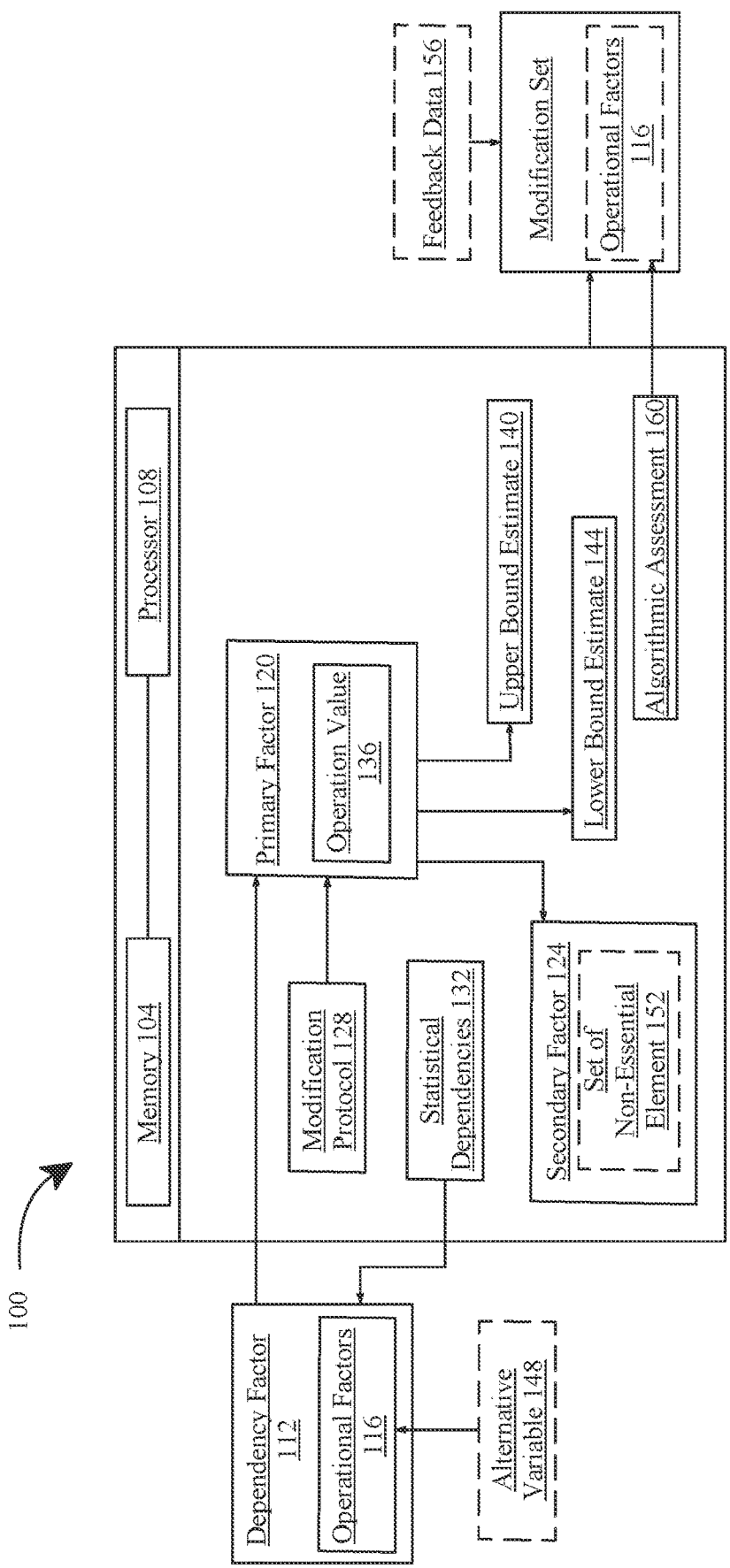
FIG. 1 is a block diagram of an exemplary apparatus for dynamic reconfiguration of process parameter.

Referring now to FIG. 1, an exemplary embodiment of an apparatus 100 for dynamic reconfiguration of process parameter is illustrated. Apparatus includes a computing device. Computing device includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 104 communicatively connected to at least a processor 108. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of physiological data, as defined above, with each other. As a non-limiting example, feature learning algorithm may detect co-occurrences of gene combinations, as defined above, with each other. Computing device may perform a feature learning algorithm by dividing physiological data from a given person into various sub-combinations of such data to create physiological data sets as described above, and evaluate which physiological data sets tend to co-occur with which other physiological data sets; for instance, where physiological state data includes genetic sequences, computing device may divide each genetic sequence into individual genes and evaluate which individual genes and/or combinations thereof tend to co-occur with which other individual genes, and/or other physiological data. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \, \ni \, c}$ dist $(c_i, x)^2$, where argmin includes argument of the minimum, $c_i$ includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, apparatus 100 for dynamic reconfiguration of process parameter, wherein apparatus 100 comprises at least a processor 108 and a memory 104 communicatively connected to the at least a processor 108, wherein the memory 104 containing instruction configuring the at least processor 108 to detect a dependency factor as a function of a plurality of operational factors 116. As used in this disclosure, a "dependency factor" is a relationship between a first variable and a second variable, which may be denoted a "dependent variable," whereby modifications to the first variable result in corresponding and/or related changes in the second and/or dependent variable. Processor 108 may employ a clustering algorithm, such as k-means clustering, to identify variables that exhibit close relationships. By analyzing the clustering results, variables that are closely associated may be identified, indicating a dependency relationship between them. Allows for the possibility of eliminating one of the closely related variables, under the premise that one may sufficiently represent or predict the behavior of the other, thereby simplifying the overall set of operational factors. Further in the process, when constructing training data for machine learning applications, the set of variables may be retained—those not eliminated due to dependency relationships—is used. This approach of using a refined variable set may enhance the efficiency of machine-learning processes by reducing computational load and resource requirements. Training data, as described in U.S. patent application Ser. No. 18/609,563 filed on Mar. 19, 2024 and entitled "APPARATUS AND METHOD FOR OPTIMIZATION USING DYNAMICALLY VARIABLE LOCAL PARAMETERS," the entirety of which is incorporated herein by reference, may undergo the trimming process, where non-essential variables, identified through the clustering and dependency analysis, may be removed. Refinement in training data set not only streamlines the machine learning process but also potentially improves the accuracy and effectiveness of the algorithms by focusing on more impactful and relevant data. Processor 108 may detect the dependency factor by applying machine learning algorithms designed to analyze the correlation and causation patterns among the plurality of operational faction 116. For example, in a manufacturing process, the speed of an assembly line (a dependency factor) may directly affect the production output and quality (dependent variables). As used in this disclosure, an "operational factor" is a measurable variables or parameter within an apparatus or process that influences its performance, efficiency, or output. These factors may include, but are not limited to, quantitative inputs such as resource availability, time constraints, and environmental conditions; qualitative inputs such as user preferences and satisfaction levels; and performance metrics such as speed, accuracy, and reliability. In another example, a personal productivity software may use an algorithm to filter and prioritize tasks based on user-defined criteria such as deadlines, personal interest, and the required energy level. Deadlines may include project due dates and integrate with digital calendars to alert users of upcoming deadlines. For instance, if a user has a report due on Friday, apparatus may prioritize this task early in the week and provide time management suggestions to ensure timely completion. Users may also rate their tasks based on personal interest, apparatus may identify and prioritize tasks that align with the user's passions or career goals. For example, if a user enjoys graphic design more than data entry, apparatus may prioritize design-related tasks to keep the user engaged and motivated. Apparatus may ask users to estimate the energy level required for each task and match it with the user's self-reported energy patterns throughout the day. For instance, if a user tends to have more energy in the morning, apparatus may schedule more demanding creative tasks during this time, rather than in the afternoon when the user's energy typically wanes. Apparatus may analyze past user activity to determine types of tasks are typically completed with the highest quality and satisfaction, suggesting similar future opportunities. For relationships, apparatus may examine communication patterns to highlight interactions that are typically followed by periods of increased productivity and positive sentiment, suggesting these are beneficial relationships to develop further. In another example, a health and wellness application may track various lifestyle factors, including exercise routines, dietary habits, social activities, and work schedules. By filtering through factor data, the application may identify patterns that correlate with periods of high energy and enjoyment. It may also recognize factors that precede stress and complexity in the user's life, offering recommendations to adjust routines and social engagements to optimize well-being. As a non-limiting example, apparatus may analyze user sleep patterns using data from a sleep tracking device and determine that sleep quality significantly affects the user's concentration levels and mood the following day. Thus, apparatus may prioritize scheduling demanding cognitive tasks or important meetings on days following a night of high-quality sleep, while recommending lighter, less demanding activities after poorer sleep, thereby enhancing daily performance and well-being.

With continued reference to FIG. 1, in an embodiment, detecting the dependence factor 112 may include analyzing statistical dependencies which involves processor 108 executing a series of computational routines designed to identify patterns and relationships between variables within the operational data. Analysis may employ statistical algorithms that can assess the strength and nature of associations, determining which variables have predictive power or influence over others. Processor 108 may utilize techniques such as correlation analysis, regression analysis, or advanced machine learning models such as neural networks or decision trees to map out the interdependencies. These techniques allow the processor to discern which factors are predictors (independent variables) and which are outcomes (dependent variables) within the given set of operational factors. An example may be in a software development environment, where the completion of milestones may depend on factors such as the number of developers and the complexity of the tasks. As a non-limiting example, in a smart home system, the dependence factor could be the indoor temperature, which might depend on external weather conditions, time of day, and the occupancy of the home. By analyzing these dependencies, apparatus may optimize energy consumption for heating and cooling, enhancing comfort while minimizing costs.

With continued reference to FIG. 1, in another embodiment, wherein apparatus is further configured to calculate a upper and lower bound estimates as a function of the at least an operational factors. As used in this disclosure, an "upper bound estimates" is a calculated maximum value that operational factors may reach under the most favorable conditions, while "lower bound estimates" is the minimum values under the least favorable conditions. bound estimates may be determined through apparatus 100 processing capabilities, which involve the use of statistical models and predictive algorithms to establish a range within which the operational factors are likely to vary. Processor may be configured to perform calculation by applying data analysis techniques such as probabilistic modeling, sensitivity analysis, or simulation methods. Processor may use the historical data, variability patterns, and any known constraints or limitations of the operational factors to compute estimates. For example, in financial portfolio management, upper bound estimate may represent the best possible return on investment considering market volatility and lower bound estimate may be the potential minimum return, accounting for the same volatility and historical market downturns. Another example could be in project management, where the upper bound estimate is the fastest project completion time with optimal resource allocation, and lower bound is the slowest completion time given potential delays. As a non-limiting example, apparatus may track skill acquisition, upper bound estimate may calculate the fastest possible time to learn a new language based on the user's daily engagement and cognitive aptitude, while lower bound estimate would consider the potential delays due to scheduling conflicts, motivational fluctuations, or other life events. This allows the user to set realistic timelines for learning goals and adjust study habits to optimize personal growth trajectory.

Still referring to FIG. 1, processor 108 configured to determine a primary factor and at least a secondary factor as a function of the dependency factor. As used in this disclosure, a "primary factor" is defined as a pivotal operational element within a set of factors whose variation has a direct and significant influence on the apparatus performance or outcome. In contrast, a "secondary factor" is an operational element whose influence on apparatus performance is contingent upon or derived from the state of the primary factor. Processor 108 may accomplish this by executing data analysis algorithms established hierarchical relationships among the operational factors, categorizing data based on their influence and dependency characteristics. Process may involve utilizing techniques such as regression analysis, where primary factor may be the independent variable that predicts the outcome, and secondary factors may be the dependent variables whose values are predicted based on primary factor. For example, in a vehicle's navigation apparatus, primary factor may be the desired arrival time, which directly affects route selection (secondary factor). Another example may be a smart thermostat system where primary factor is the desired temperature setting, and secondary factors include the external temperature and the time of day. As a non-limiting example, primary factor may be the user's designated priority tasks, which dictate the allocation of time and resources, influencing the scheduling of other less critical tasks (secondary factors). Processor configuration may identify and categorize tasks and enables users to focus their efforts on high-priority activities while efficiently managing their broader task portfolio.

With continued reference to FIG. 1, in an embodiment, wherein primary factor may include at least one secondary factor as a function of an operation value. As used in this disclosure, "operational value" is a quantifiable measure of performance, efficiency, or output that is derived from or influenced by primary factor. The operational value may serve as a benchmark or pivot point around which secondary factors are evaluated and adjusted. Processor 108 may be configured to integrate the primary factor with one or more secondary factors based on operational values, effectively creating a composite metric that represents a multifaceted view of apparatus performance. Integration may be achieved by using algorithms capable of weighted analysis, where the operational value of primary factor may be used to calibrate the significance or weight of secondary factors within the overall apparatus operation. For instance, in a computational fluid dynamics (CFD) simulation, primary factor may be the velocity of the fluid, which directly affects secondary factors such as pressure and turbulence, each having an operational value that contributes to the simulation's accuracy. Another example may be an e-commerce platform, where primary factor may be user engagement, and secondary factors like page load time and click-through rate may be included based on their operational values related to user experience and sales conversion. As a non-limiting example, a mobile health application where the primary factor may be the user's daily step count, which is a significant determinant of overall health metrics. Secondary factors like heart rate and calories burned may be included as functions of the operational value, secondary factors may be adjusted or interpreted in the context of the step count data to provide a more comprehensive health assessment for the user.

Still referring to FIG. 1, the at least processor 108 to modify primary factor as a function of a specified modification protocol. As used in this disclosure, a "specified modification protocol" is a predetermined set of computational rules and procedures designed to adjust primary factor in a systematic and controlled manner. Specified modification protocol outlines the specific conditions under which modifications should be made, the extent of permissible changes, and the desired state of primary factor post-modification. Processor 108 may modify primary factor by executing modification protocol, which may involve steps such as assessing current factor values, applying a series of computational transformations, and validating the outcomes against performance criteria. Process is typically algorithm-driven and may incorporate feedback loops to fine-tune the modifications based on real-time system feedback. For example, in a climate control system, modification protocol may dictate how to adjust the temperature setting based on time of day and occupancy patterns to maintain comfort while optimizing energy use. As a non-limiting example, consider a software development project management tool where primary factor is the allocation of developer resources to tasks. Modification protocol may specify adjustments to resource allocation based on project timelines, developer skill sets, and task urgency, ensuring that critical project milestones are met efficiently.

With continued reference to FIG. 1, in an embodiment, wherein specified modification protocol may be configured to calibrate primary factor operation parameter. Calibration may involve adjusting the operational settings or conditions of primary factor to improve apparatus performance or to meet a set target. Calibration is typically a precise process that adjusts the primary factor to a fine degree, based on a comparison between current performance data and a desired standard or goal. Processor 108 may calibrate primary factor operational parameter by executing the modification protocol, may include steps such as data acquisition from system sensors or inputs, application of mathematical models to compute the necessary adjustments, and the deployment of control signals to implement these adjustments. Processor 108 may use optimization algorithms or control theory principles to determine the optimal settings for primary factor. For example, in an automated manufacturing system, calibration might involve adjusting the speed of a conveyor belt (the primary factor) to optimize the flow of materials and minimize bottlenecks. In a digital camera system, primary factor may be the aperture setting, processor may calibrate based on lighting conditions to capture the best possible image quality. As a non-limiting example, in a corporate training program, primary factors may be the core competencies of communication and leadership. By calibrating the training protocols to optimize key skills, secondary factors such as team collaboration, conflict resolution, and project management are also likely to improve, following the premise that strong communication and leadership foster better teamwork and project execution across the organization.

With continued reference to FIG. 1, in another embodiment, modifying primary factor may further includes substituting the at least an operational factor with an alternative variable. An "alternative variable," as used in this disclosure, is a distinct operational element that depends on the original factor or that the original factor depends on, for instance and without limitation as determined using dependency factor as above. Dependency may be causal or correlative; that is, in some embodiments two variables may be correlated closely with one another, for instance and without limitation as identified using a clustering algorithm, in which case one or more such correlated values may be replaced with a value that correlates with them. Several original factors may depend on a single alternative variable, or may have a single alternative variable depend on them; in an embodiment, substitution of alternate variable may potentially offers improvements such as enhanced efficiency, reduced cost, increased reliability, or other superior performance traits. For instance, a training set with the above substitution may be used to train a model having fewer inputs and/or outputs that uses less memory and/or computational resources for training; deployment may be possible within tighter constraints in one or more devices deploying such a model. For instance, a low-power device such as a microcontroller may be capable of supporting a more accurate model trained using training data that has been simplified with the above-described replacement of one or more variables with alternative variables. Similarly, simplified training data and/or models may be capable of faster execution and/or of accurate execution with fewer known input variables. In particular, alternative variables may be chosen to replace input variables to a model that are not readily measured or available with correlated input variables that are readily measured or available. Apparatus may be configured to receive feedback indicating which variable of a correlated set of variables is not available and/or feedback indicating which variable of a correlated set of variables is available, and substituting available variables for unavailable variables in training data; apparatus may then retrain a machine-learning model and/or neural network with the substituted set. This may be performed iteratively-a variable that is available upon a first deployment of a model may become unavailable, and substitution, retraining, and redeployment may produce a deployed model that is able to work without that variable. The alternative variable may be one that is related to, or identified through, the dependency relationship established between variables as previously described. By leveraging these identified dependencies, apparatus may effectively reduce the number of variables required for processing. This approach simplifies the operational framework of the system by focusing on variables that are most impactful, thereby streamlining the data analysis and optimization processes. The substitution with alternative variable may be informed by the dependency relationships, ensuring that the essential characteristics and functionalities of the eliminated variable may be preserved and enhanced in the operational process. Processor 108 may facilitate the substitution by evaluating the efficacy of current operational factors and identifying potential alternative variables that may achieve the same objectives more effectively. Process may involve comparing performance metrics, compatibility assessments, and cost-benefit analyses to determine the suitability of the alternative variable. For instance, in a resource allocation system, primary factor might be the resource distribution algorithm, which could be modified by substituting a static allocation model (an operational factor) with a dynamic, demand-based allocation model (an alternative variable) to improve system responsiveness and efficiency. Another example could be in the context of energy management systems, where a primary factor such as a fixed electricity consumption schedule might be substituted with an AI-optimized usage schedule (alternative variable) that adjusts in real-time to usage patterns and peak demand periods. As a non-limiting example, related to personal development, consider a time management application where primary factor is the method used to prioritize daily tasks. The application may substitute a basic priority ranking system (an operational factor) with a more sophisticated algorithm (an alternative variable) that also accounts for the user's personal energy cycles and cognitive load, not just deadlines and importance. Substitution may aim to align task scheduling with times when the user is most productive, thereby enhancing personal efficiency and reducing stress.

Still referring to FIG. 1, the at least processor 108 is configured to eliminate the at least a secondary factor and generate a modification set of operational factors. As used in this disclosure, a "modification set" is a collection of operational factors that have been adjusted, recalibrated, or otherwise modified to enhance the functionality or performance of a system or process. The modification set may represent the updated state of apparatus operational factors following the elimination of redundant or less influential factors and the application of modification protocol to the remaining factors. Processor 108 may eliminate secondary factors deemed non-critical or redundant based on their calculated impact or contribution to apparatus objectives. Following this, processor may compile modification set by reconfiguring the operational parameters of apparatus to reflect the new, optimized state. This involves applying algorithmic transformations to the data representing the operational factors and re-establishing their interrelations and functional roles within apparatus. In an embodiment, wherein eliminating the at least a secondary factor further includes removing a set of non-essential element to the primary factor. For example, in a content recommendation system, secondary factors such as rarely clicked genres or topics may be removed to streamline the recommendation engine's focus on content with higher engagement rates. In a home automation system, the processor might eliminate redundant or seldom-used lighting settings from the control algorithm to enhance the system's responsiveness and user experience. As a non-limiting example, in a personal fitness application, if primary factor is the user's workout intensity and duration, processor may eliminate secondary factors such as the tracking of exercises deemed non-essential for the user's specific fitness goals, like certain low-impact activities, to concentrate on high-impact exercises that directly contribute to the user's desired outcomes.

With continued reference to FIG. 1, in another embodiment, wherein modification set further includes reflecting recalibrated primary factor and the streamlined secondary factor. modification set may be an updated suite of operational factors that have been optimized, with primary factor adjusted to its ideal state and any secondary factors either refined for better synergy with primary factor or pruned to eliminate inefficiencies. For example, in a renewable energy management system, primary factor may be the output setting of a solar panel array, and secondary factors may include the angle of the panels and the cleaning schedule. Modification set may reflect an optimized output setting in conjunction with an ideal panel angle and a maintenance routine that maximizes energy capture. As a non-limiting example, a time management tool that may help users enhance productivity. Primary factor may be the user's prioritization algorithm, may be recalibrated to align with user peak productivity periods. The streamlined secondary factors may include notification settings and app integrations that have been adjusted to support this optimized prioritization, ensuring that the user remains focused on high-impact tasks with minimal distractions.

With continued reference to FIG. 1, in an additional embodiment, wherein apparatus 100 may further be configured to reevaluate the optimization process as a function of feedback data derived from modification set. As used in this disclosure, "feedback data" is the information collected post-implementation of modification set that reflects the outcomes or performance changes resulting from the recent recalibrations and adjustments. Feedback data is indicative of the effectiveness of the modifications. Processor 108 within apparatus 100 may conduct a reevaluation by analyzing the feedback data, which may include quantitative performance metrics, user satisfaction ratings, or other relevant operational indicators. Based on the analysis, processor may determine whether the applied modifications have achieved the intended objectives or whether additional adjustments are necessary. Process may ensure that the optimization is dynamic and responsive to actual apparatus performance and user interaction. For example, in an automated manufacturing system, feedback data may include production output rates and defect rates following adjustments to machine calibration settings. In an educational software platform, feedback data may reflect student engagement and comprehension levels after the introduction of new adaptive learning algorithms. As a non-limiting example, consider a diet and exercise tracking app that recalibrates nutritional guidelines and workout plans for a user. Feedback data in this case may consist of the user's health metrics, such as weight changes and energy levels, and their subjective feedback on the regimen's manageability and satisfaction. Processor 108 may use this feedback to fine-tune the app's recommendations, aiming to enhance the user's overall well-being and progress toward fitness goals.

With continued reference to FIG. 1, in another embodiment, wherein apparatus 100 may be further configured to apply an algorithmic assessment to the plurality of operational factors. As used in this disclosure, an "algorithmic assessment" is a computational process by which apparatus 100 may evaluate the operational factors using a series of algorithms designed to measure, analyze, and derive insights from the data associated with those factors. The algorithmic assessment may include, but is not limited to, statistical analysis, pattern recognition, and predictive modeling, all aimed at identifying efficiencies, inefficiencies, and areas for potential improvement. Processor 108 within apparatus 100 may perform algorithmic assessment by first collecting data related to operational factors, then executing the chosen algorithms which may involve data mining techniques, machine learning models, or heuristic evaluations to process and interpret the data. In a logistics management system, algorithmic assessment may evaluate route efficiency, vehicle load capacity, and scheduling to optimize delivery times and reduce fuel consumption. As a non-limiting example, a fitness application may apply algorithmic assessment to factors exercise frequency, workout intensity, and caloric intake to provide the user with a personalized fitness plan. The plan would be continuously refined based on the app's assessment of the user's progress and any changes in the physical condition or fitness goals.

Figure 2:
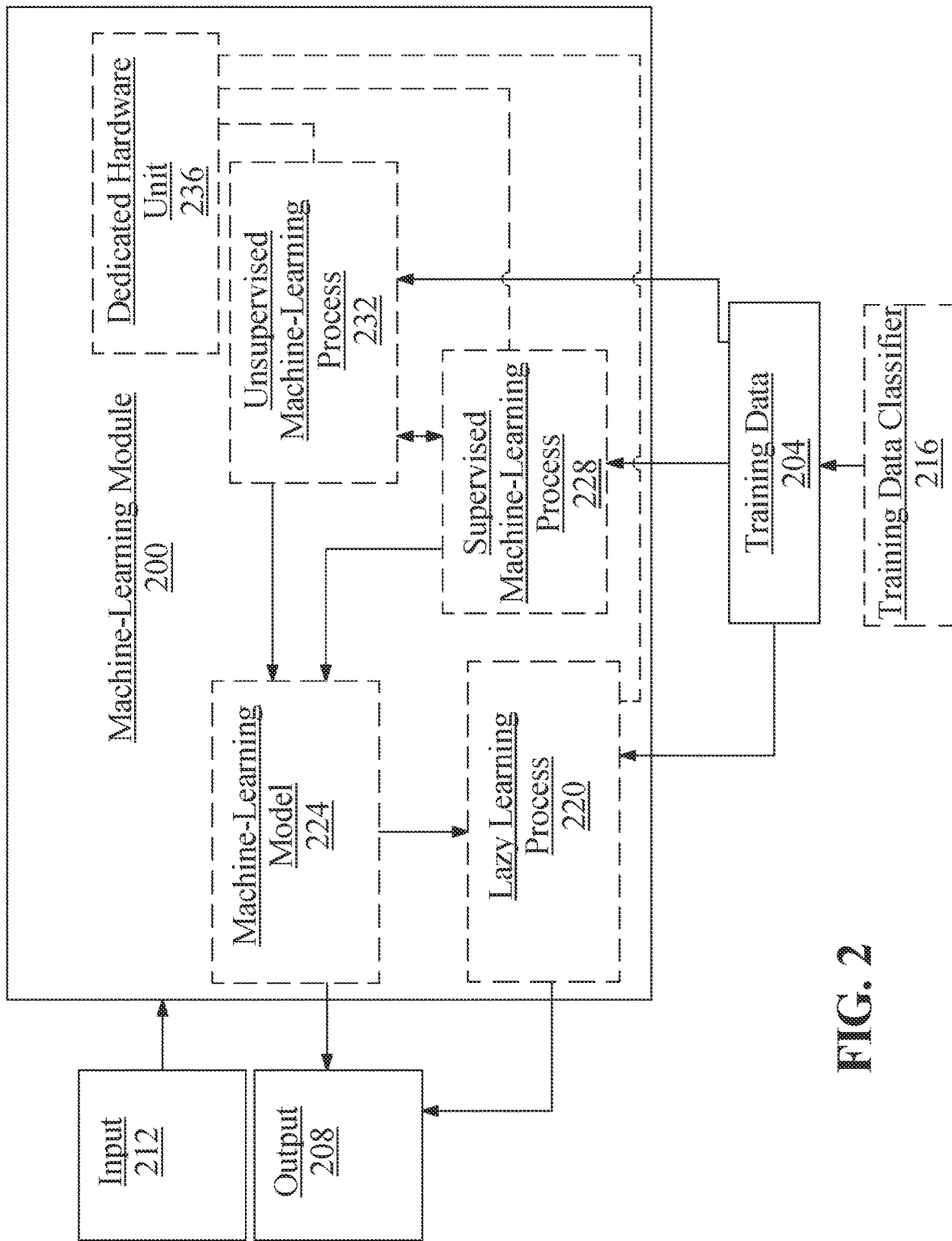
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example input data might include the frequency and duration of specific tasks (primary factors) and the associated energy levels and enjoyment ratings reported by the user (secondary factors). This data could be correlated to output data that suggests an optimal daily schedule (an optimized configuration of factors) which maximizes productivity (results) and aligns with the user's peak energy times (energy), while also incorporating preferred tasks (enjoyment) and minimizing activities that historically contribute to stress and complexity.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to identify sub-populations that share similar patterns of factor interactions. Training data may involve segregating user data into cohorts based on their responses to certain operational changes or their interactions with the system under various conditions. For instance, training data may be filtered to distinguish between users who demonstrate high productivity and low stress levels in response to specific factor adjustments and those who do not. By focusing on this sub-population, the machine learning training algorithm may more accurately learn the characteristics of effective factor configurations, leading to a more tailored and efficient optimization model. This specificity in training data improves the model's ability to predict optimal operational states, tailor recommendations to individual user profiles, and ultimately enhance the user's experience by providing a personalized set of operational factors that align with their unique efficiency patterns and stress thresholds.

Still referring to FIG. 2, computing device 204 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 204 may then calculate a likelihood table by calculating probabilities of different data entries and classification labels. Computing device 204 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 204 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
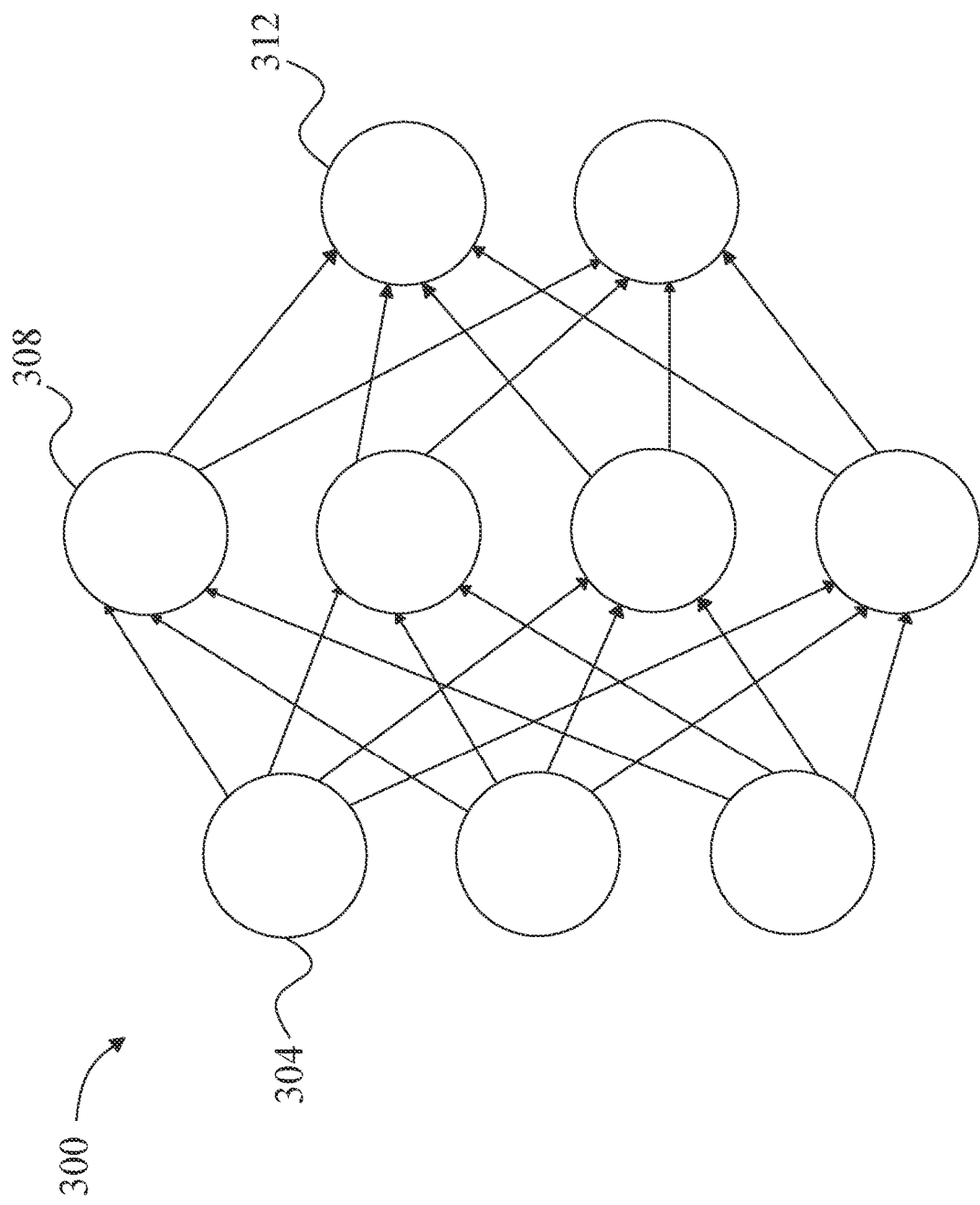
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
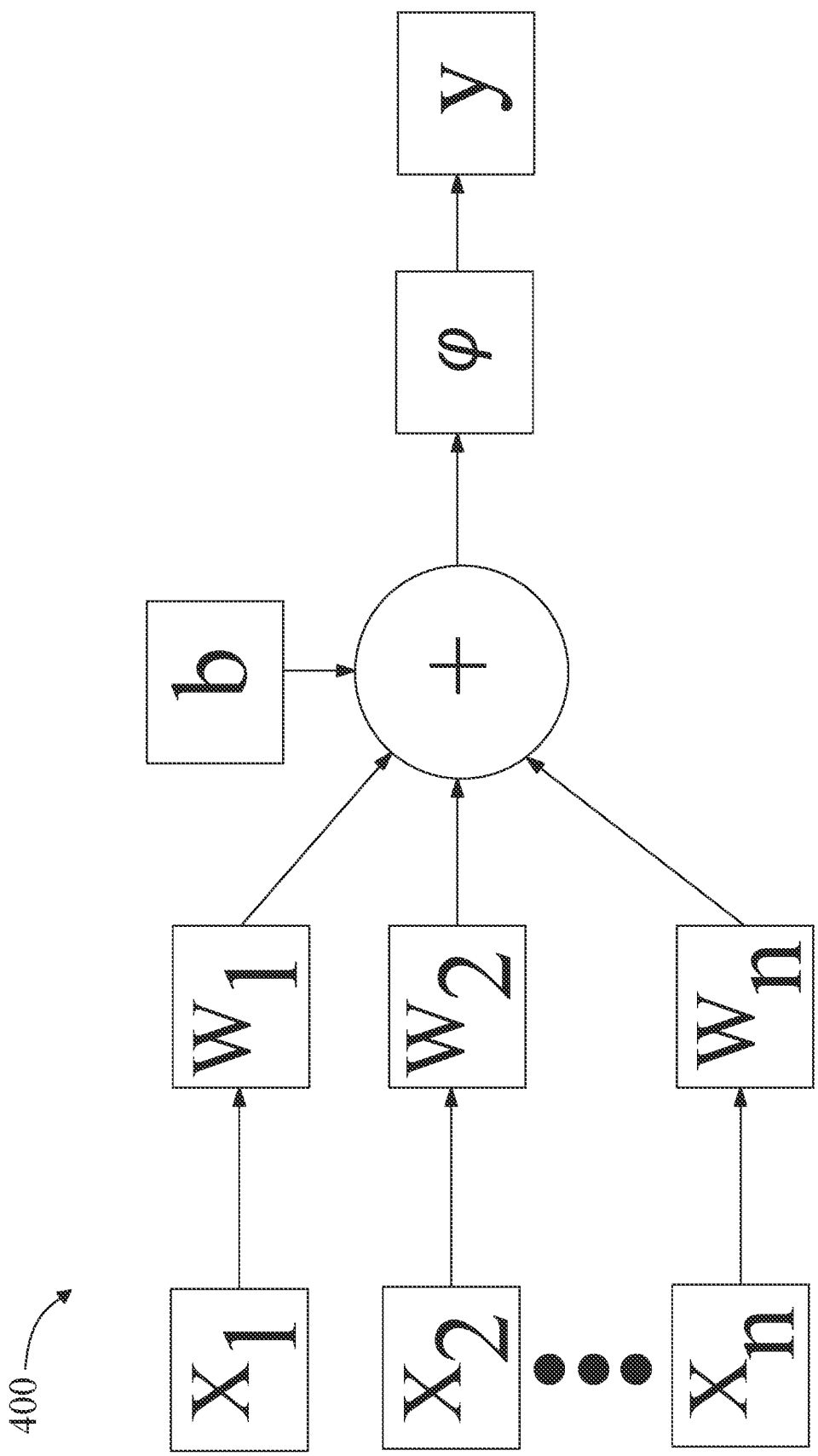
FIG. 4 is a diagram of an exemplary embodiment of a node of a neural network.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
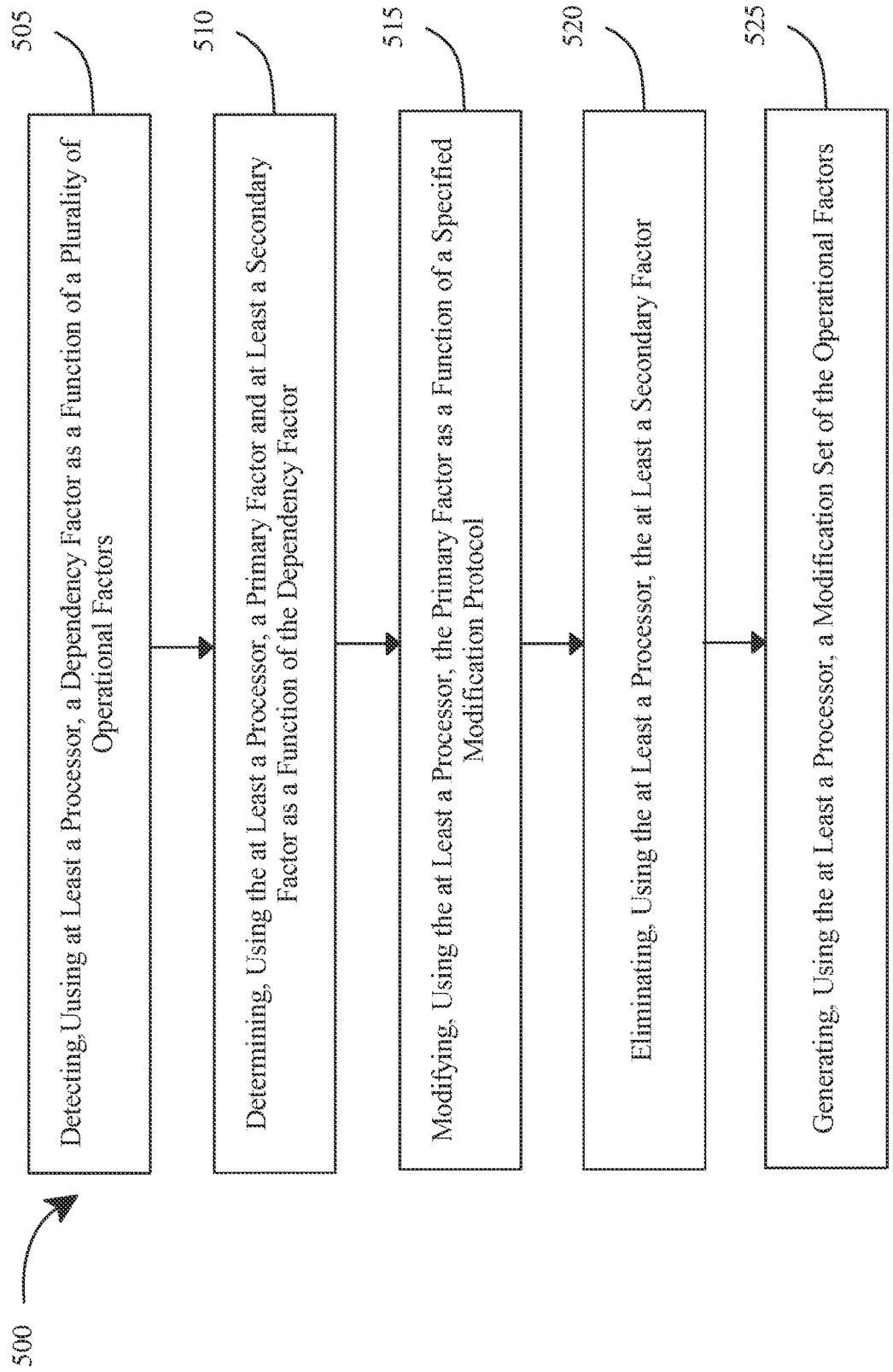
FIG. 5 is a flow diagram illustrating an exemplary workflow of a method for dynamic reconfiguration of process parameter.

Referring now to FIG. 5, a flow diagram of an exemplary method 500 for dynamic reconfiguration of process parameter is illustrated. Method 500 includes step 505 of detecting, using at least a processor, a dependency factor as a function of a plurality of operational factors. This may be implemented, without limitation, as described above with reference to FIGS. 1-4.

With continued reference to FIG. 5, method 500 includes a step 510 of determining, using the at least a processor, a primary factor and at least a secondary factor as a function of the dependency factor. This may be implemented, without limitation, as described above with reference to FIGS. 1-4.

With continued reference to FIG. 5, method 500 includes a step 515 of modifying, using the at least a processor, the primary factor as a function of a specified modification protocol. This may be implemented, without limitation, as described above with reference to FIGS. 1-4.

With continued reference to FIG. 5, method 500 includes a step 520 of eliminating, using the at least a processor, the at least a secondary factor. This may be implemented, without limitation, as described above with reference to FIGS. 1-4.

With continued reference to FIG. 5, method 500 includes a step 525 of generating, using the at least a processor, a modification set of the operational factors. This may be implemented, without limitation, as described above with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
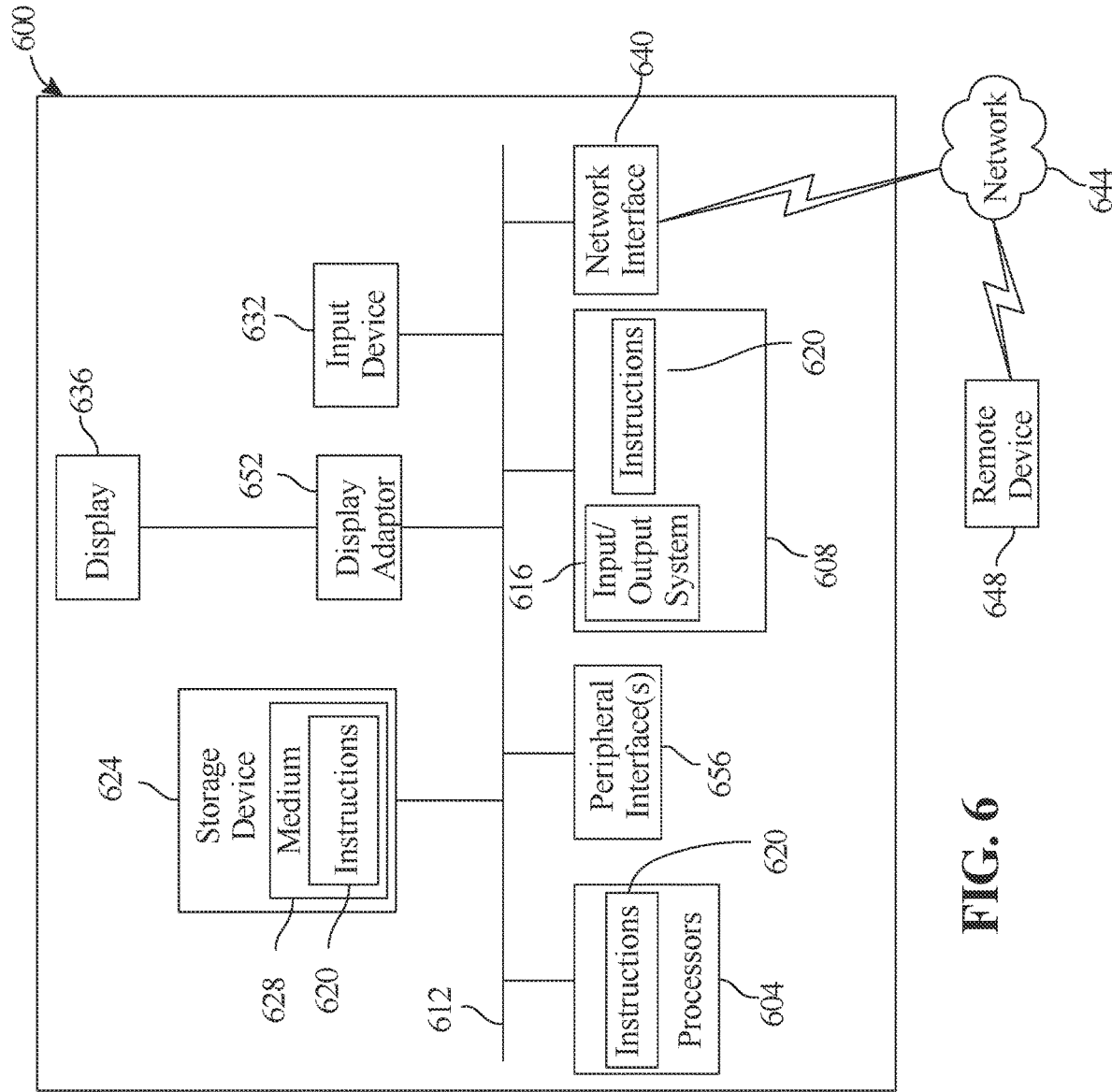
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for dynamic reconfiguration of process parameter, wherein the apparatus comprises:
   at least a processor; and
   a memory communicatively connected to the at least a processor, wherein the memory contain instructions configuring the at least a processor to:
   detect a dependency factor as a function of a plurality of operational factors of a process;
   determine a primary factor and at least a secondary factor as a function of the dependency factor;
   modify the primary factor as a function of a specified modification protocol;
   eliminate the at least a secondary factor; and
   generate a modification set of the operational factors.

2. The apparatus of claim 1, wherein detecting the dependency factor comprises analyzing statistical dependencies.

3. The apparatus of claim 1, wherein the primary factor comprises at least one secondary factor as a function of an operation value.

4. The apparatus of claim 1, wherein the specified modification protocol is configured to calibrate the primary factor operation parameters.

5. The apparatus of claim 1, wherein the apparatus is further configured to calculate a upper and lower bound estimates as a function of the at least an operational factors.

6. The apparatus of claim 1, wherein modifying the primary factor further comprises substituting the at least a operational factor with an alternative variable.

7. The apparatus of claim 1, wherein eliminating the at least a secondary factor further comprises removing a set of non-essential element to the primary factor.

8. The apparatus of claim 1, wherein the modification set further comprises reflecting recalibrated primary factor and the streamlined secondary factors.

9. The apparatus of claim 1, wherein the apparatus is further configured to reevaluate the optimization process as a function of feedback data derived from the modification set.

10. The apparatus of claim 1, wherein the apparatus is further configured to apply an algorithmic assessment to the plurality of operational factors.

11. A method for dynamic reconfiguration of process parameter, the method comprising:
    detecting, using at least a processor, a dependency factor as a function of a plurality of operational factors;
    determining, using the at least a processor, a primary factor and at least a secondary factor as a function of the dependency factor;
    modifying, using the at least a processor, the primary factor as a function of a specified modification protocol;
    eliminating, using the at least a processor, the at least a secondary factor; and
    generating, using the at least a processor, a modification set of the operational factors.

12. The method of claim 11, wherein detecting the dependency factor comprises analyzing statistical dependencies.

13. The method of claim 11, wherein the primary factor comprises at least one secondary factor as a function of an operation value.

14. The method of claim 11, wherein the specified modification protocol, further comprising calibrating, using the at least a processor, the primary factor operation parameters.

15. The method of claim 11, further comprises calculating, using the at least a processor, a upper and a lower bound estimates as a function of the at least an operational factors.

16. The method of claim 11, wherein modifying the primary factor further comprises substituting the at least a operational factor with an alternative variable.

17. The method of claim 11, wherein eliminating the at least a secondary factor further comprises removing a set of non-essential element to the primary factor.

18. The method of claim 11, wherein the modification set further comprises reflecting, using the at least a processor, recalibrated primary factor and the streamlined secondary factors.

19. The method of claim 11, further comprises reevaluating, using the at least a processor, the optimization process as a function of feedback data derived from the modification set.

20. The method of claim 11, further comprises applying, using the at least a processor, an algorithmic assessment to the plurality of operational factors.

* * * * *